(12) United States Patent
Rejman et al.

(10) Patent No.: US 7,887,942 B2
(45) Date of Patent: Feb. 15, 2011

(54) DEVICE FOR LOCKING ELECTRICAL DEVICES, IN PARTICULAR POWER TOOLS, WITH BATTERY PACKS FOR POWER SUPPLY

(75) Inventors: Marcin Rejman, Waiblingen (DE); Wolf Matthias, Stuttgart (DE); Urs Roth, Flumenthal (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/632,524

(22) Filed: Dec. 7, 2009

(65) Prior Publication Data

US 2010/0081044 A1    Apr. 1, 2010

Related U.S. Application Data

(63) Continuation of application No. 10/576,116, filed on Apr. 18, 2006, now Pat. No. 7,682,726.

(51) Int. Cl.
*H01M 2/10* (2006.01)
(52) U.S. Cl. ........................... 429/97; 429/96; 429/100; 429/123
(58) Field of Classification Search ............... 429/97
See application file for complete search history.

(56) References Cited

U.S. PATENT DOCUMENTS 5,903,132 A * 5/1999 Ohira et al. .................. 320/107
6,577,101 B1    6/2003 Takeshita et al.

FOREIGN PATENT DOCUMENTS

| CN | 1268776 | 10/2000 |
|----|---------|---------|
| JP | 4-137354 | 5/1992 |
| JP | 4137354 | * 5/1992 |

* cited by examiner

*Primary Examiner*—Dah-Wei D Yuan
*Assistant Examiner*—Patricia Davis
(74) *Attorney, Agent, or Firm*—Michael J. Striker

(57) ABSTRACT

A battery pack for locking with a power tool with at least one movable locking bar has at least a front recess and a rear recess located after the front recess in the direction of a relative motion between the battery pack and the power tool, the recesses are configured as detent grooves, and the recesses are differently shaped and are offset transversely to the direction of motion; and a power tool locks with the battery pack.

10 Claims, 3 Drawing Sheets

DEVICE FOR LOCKING ELECTRICAL DEVICES, IN PARTICULAR POWER TOOLS, WITH BATTERY PACKS FOR POWER SUPPLY

CROSS-REFERENCE TO RELATED APPLICATION

This application is a continuation of U.S. patent application Ser. No. 10/576,116 filed Apr. 18, 2006, now U.S. Pat. No. 7,682,726 which is incorporated herein by reference and which makes a basis for claiming the priority of the present application.

The invention described and claimed hereinbelow is also described in German Patent Application DE 10 2004 0434 827.7 filed on Sep. 10, 2004. This German Patent Application provides the basis for a claim of priority of invention under 35 U.S.C. 119(a)-(d).

BACKGROUND OF THE INVENTION

The invention relates to a device for locking electrical devices, in particular power tools, with battery packs for power supply, and to a battery pack and an electrical device. The term "battery pack" used here is intended also to include battery packs that contain rechargeable batteries (also known as accus).

For securing a battery pack acting as a power supply, large, heavy power tools that are guided by hand, such as drill hammers or the like, in particular have a device of the type defined above, with a two-stage locking means known as a double locking means. In older devices, a locking bar is provided in a housing of the electrical device and is movable counter to the force of a spring. The locking bar enters successively into engagement with two detent grooves in the battery pack, which are cut out one after the other, in the direction of the relative motion during the attachment of the battery pack, in a part of the battery pack located diametrically opposite the locking bar. The front detent groove, with which the locking bar enters into engagement first as the battery pack is being attached, serves there to connect the battery pack to the housing of the power tool in such a way that it can no longer be release from the housing, unless the locking bar is actuated manually. This assures that for transporting the power tool, the battery pack is fixed in the power tool housing so that it is secured against falling out, but as yet without contact between the terminals of the battery pack and of the power tool. This contact is not established until the battery pack is thrust by the user far enough into the power tool housing that the locking bar engages the rear detent groove, after having been forced out of the front detent groove automatically at the onset of this insertion motion.

On the one hand, manufacturers of various battery-operated electrical devices want not only to embody the battery packs such that they can be used in all kinds of devices, but also to largely standardize the devices in terms of their interface with the battery pack, by using essentially the same locking mechanism in all kinds of devices. On the other hand, a double locking means is usually not wanted in all of these kinds of devices, for example because a double locking means is unnecessary in devices with small, lightweight battery packs, or because in some devices the customer does not expect a double locking means and hence mistakenly already assumes that proper contact between the electrical device or the battery pack is established upon engagement of the locking bar or locking bars with the front detent groove or the detent grooves.

SUMMARY OF THE INVENTION

At the place where the locking bar, including the actuation device, together hereinafter called the locking mechanism, is conventionally located in the in the electrical device, while the recesses for the locking bar are provided in the battery pack, the device of the invention and the battery pack have the advantage that when identical battery packs and a locking mechanism with a suitable embodied or positioned locking bar are used, the capability is created of selectively providing a single or a double locking means, or for reasons of space, for instance, of performing the final locking selectively with the front recess or with the rear recess. Another advantage is that except from the locking bar itself or its installed position in the device, the locking mechanism can be standardized in all kinds of devices.

With the device of the invention it is for instance possible, in a combination of an electrical device and a battery pack, to make the contact between the battery pack and a current circuit of a consumer of the electrical device only upon engagement of the locking bar with the rear recess, while in a different combination of an electrical device and a battery pack, the contact is already made upon engagement of the locking bar with the front recess.

A different shape of the recesses is expediently attained by providing a protrusion in one of the recesses, preferably in the form of a rib dividing the recess, which makes it possible for a locking bar to engage a cutout, preferably a slot that receives the rib, that is complementary with the protrusion, while the engagement of a locking bar without a cutout of this kind is prevented. The recesses themselves are expediently embodied as detent grooves, as in the prior art.

If in a combination of an electrical device and a battery pack, the possibility of a double locking means is to be provided, and if in two other combinations of an electrical device and a battery pack with a single locking means the locking is to be made in the one case upon engagement of the locking bar with the front recess and in the other case upon engagement of the locking bar with the rear recess, then in a preferred embodiment of the invention it can be provided that two recesses of different shape and different dimensions, or two recesses offset from one another and of different shape or different dimensions, can be combined with one another.

Furthermore, it is also possible to provided more than two recesses, located one after the other in the relative motion upon locking, of which each enters into engagement with the locking bar of a different electrical device, in order to accomplish the locking; two of the recesses at a time may be jointly operative in pairs, to accomplish a double locking.

The locking bars are preferably provided in the electrical devices, and the recesses in the battery packs, but a reverse arrangement is also fundamentally possible.

The invention will be described in further detail below in terms of two exemplary embodiments in conjunction with the drawings.

DESCRIPTION OF THE PREFERRED EMBODIMENTS

Figure 1:
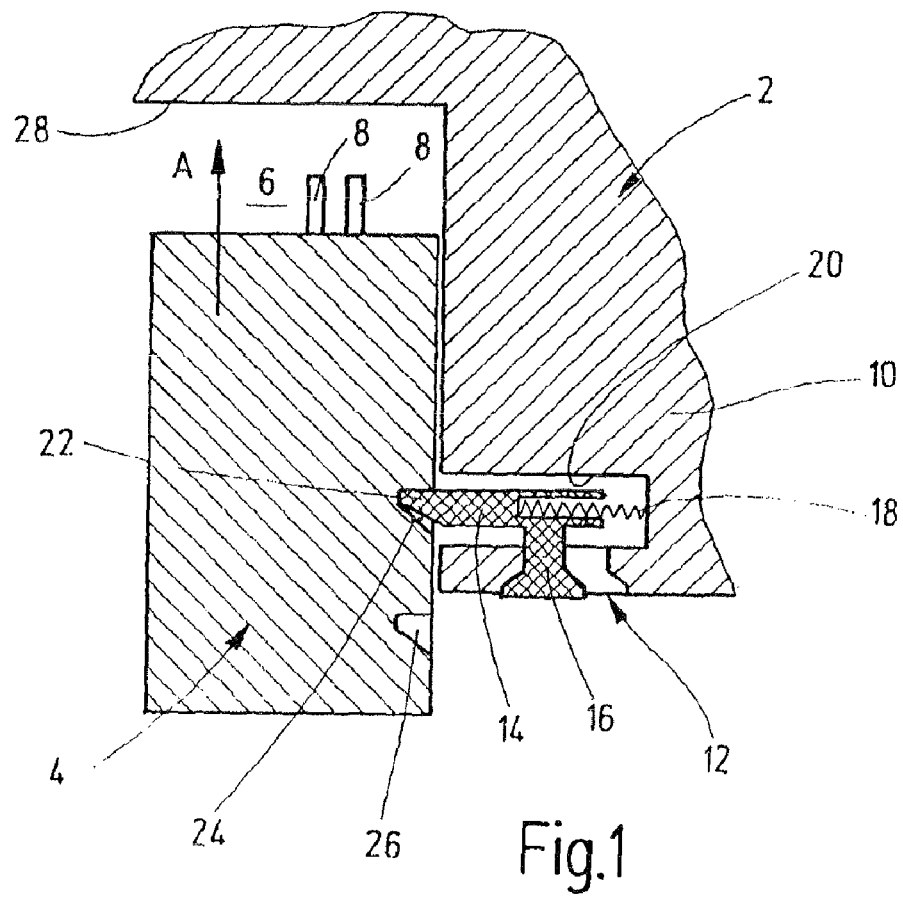
FIG. 1: a cross-sectional view of part of a combination of an electrical device and a battery pack with double locking, after the battery pack has been partially introduced.

In a combination, shown only in part in the drawing, of an electrical device 2, such as a hand-guided electrical power tool, and a battery pack 4 serving as a power supply for the electrical device 2, the electrical device 2 conventionally has a seat 6 for the battery pack 4; the battery pack is thrust into this seat in the direction of the arrow A, on the one hand for connecting the battery pack securely to the electrical device 2 and on the other for making an electrically conductive connection between terminal contacts 8 of batteries in the battery pack 4 and a current circuit of the consumer (not shown) of the electrical device 2.

For restraining the battery pack 4 in the seat 6, a housing 10 of the electrical device 2 has a locking mechanism 12, which when the battery pack 4 is introduced into the seat 6 brings about locking of the battery pack to the housing 10. The locking mechanism 12 includes a plurality of locking bars, only of which is shown at 14. The locking bar 14 is rigidly connected to an actuation slide 16, which protrudes outward past the housing 10, and is displaceable counter to the force of a spring 18 in a guide 20 cut out of the housing 10. The guide 20 is open toward the seat 6 in the direction of motion of the locking bar 14, so that a free face end 22 of the locking bar protrudes into the seat 6 when the slide 16 is not actuated. The face end 22 is beveled on its side toward the opening of the seat 6, so that when the battery pack 4 is introduced, the locking bar 14 is pressed into the guide 20, counter to the force of the spring 18.

Figure 2:
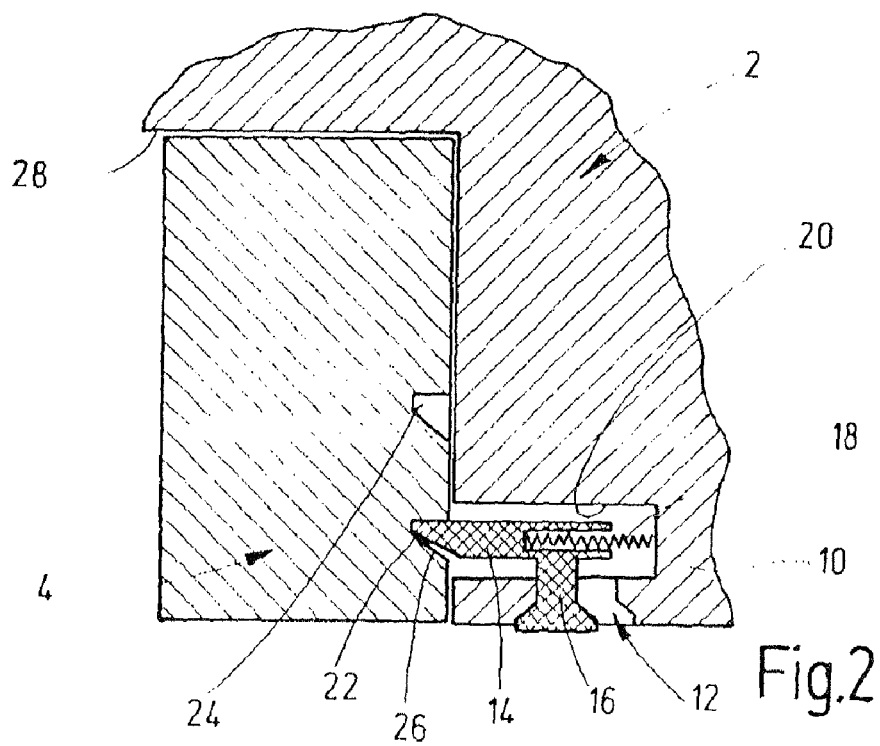
FIG. 2, a view corresponding to FIG. 1, but after the battery pack has been completely introduced.

The battery pack 4 is also provided, in its side toward the guide 20, with two detent grooves 24 and 26, which the face end 22 of the locking bar 14 automatically engages in succession when the battery pack 4, on being introduced into the seat 4, reaches the position shown in FIG. 1 and the position shown in FIG. 2, respectively.

The front detent groove 24, as viewed in the direction of motion of the battery pack upon insertion or locking, serves to lock the battery pack 4 to the housing 10 in the position shown in FIG. 1, to prevent the battery pack 4 from falling out, for instance while being transported. In this position, the terminal contacts 8 of the battery pack 4 do not yet engage associated receiving bushes (not visible) of the electrical device 2 that are provided in a bottom 28 of the seat 6, so that as yet there is still no electrical connection between the batteries of the battery pack and the current circuit of the consumer of the electrical device 2. The rear detent groove 26 serves to lock the battery pack 4 to the housing 10 in the position shown in FIG. 2, in which, because of the engagement of the terminal contacts 8 with the receiving bushes of the electrical device 2, an electrical contact between the batteries and the electrical device 2 does exist. The two grooves 24 and 26 have a cross-sectional shape adapted to the cross-sectional shape of the front face end 22 of the locking bar 14, and they are somewhat wider than the locking bar 14.

Figure 3:
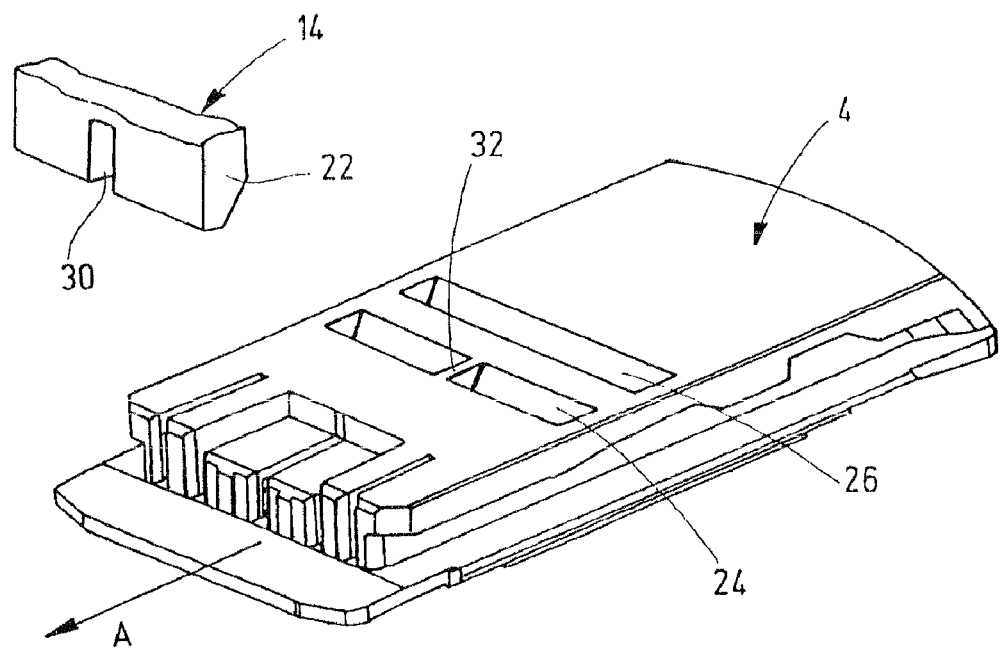
FIG. 3: an exploded view in perspective, partly cut away, of one side of the battery pack in conjunction with the locking bar of the electrical device of FIGS. 1 and 2.

As best shown in FIG. 3, the face end 22 of the locking bar 14 that enters into engagement with the grooves 24, 26 is provided with a central slot 30, which extends, with constant cross-sectional dimensions, through the face end 22 in the direction of motion of the battery pack 4. Of the two grooves 24 and 26, the rear groove 26 extends with constant cross-sectional dimensions over its entire width, while the front groove 24, with the same width in the middle, is interrupted by a rib 32 that extends in the direction of motion of the battery pack. The rib 32 is located diametrically opposite the slot 30 in the locking bar 14 and is somewhat narrower than this slot, so that the face end 22 of the locking bar 14 can engage the first and the second grooves 24, 26 unhindered, in order to enable the double locking between the electrical device 2 and the battery pack 4 as described in conjunction with FIGS. 1 and 2.

Figure 4:
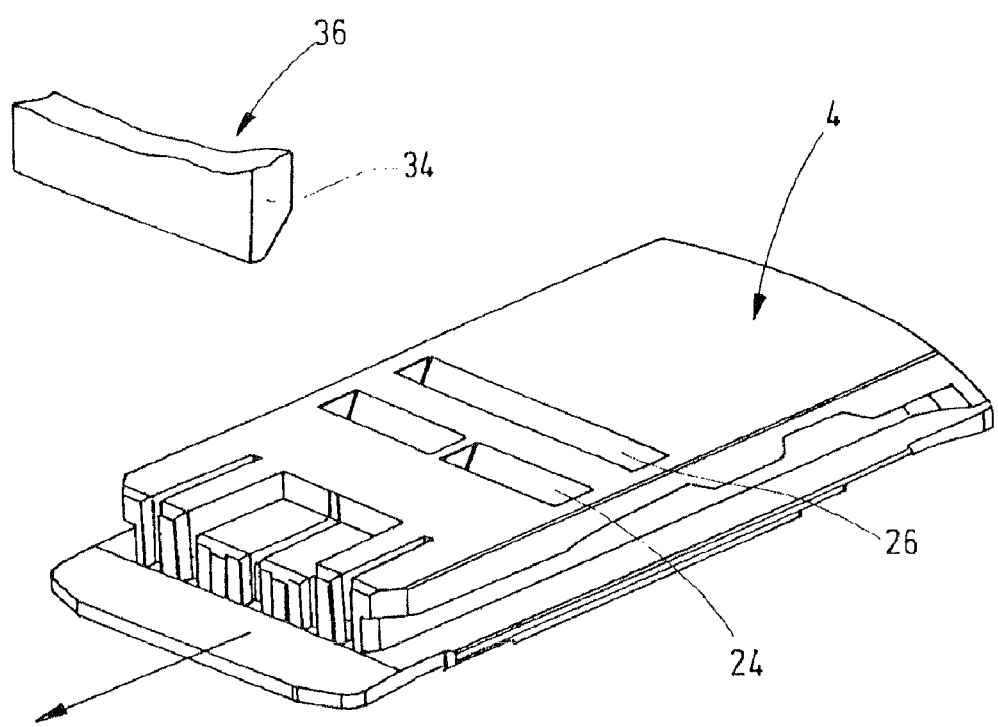
FIG. 4: a view corresponding to FIG. 3, but in conjunction with the locking bar of an electrical device without double locking.

While the battery pack 4 shown in FIG. 4 is identical to the battery pack of FIGS. 1-3, in FIG. 4 the front face end 34 of a locking bar 36 of an otherwise identically or similarly constructed locking mechanism 12 of a different electrical device (not shown) is not provided with the slot 30, so that it moves past the front groove 24 and enters into engagement with only the rear groove 26. The locking between the battery pack therefore takes place in the form of a single locking means, in which mechanical locking is established only together with the electrical contact in the position shown in FIG. 2 of the battery pack 4.

Figure 5:
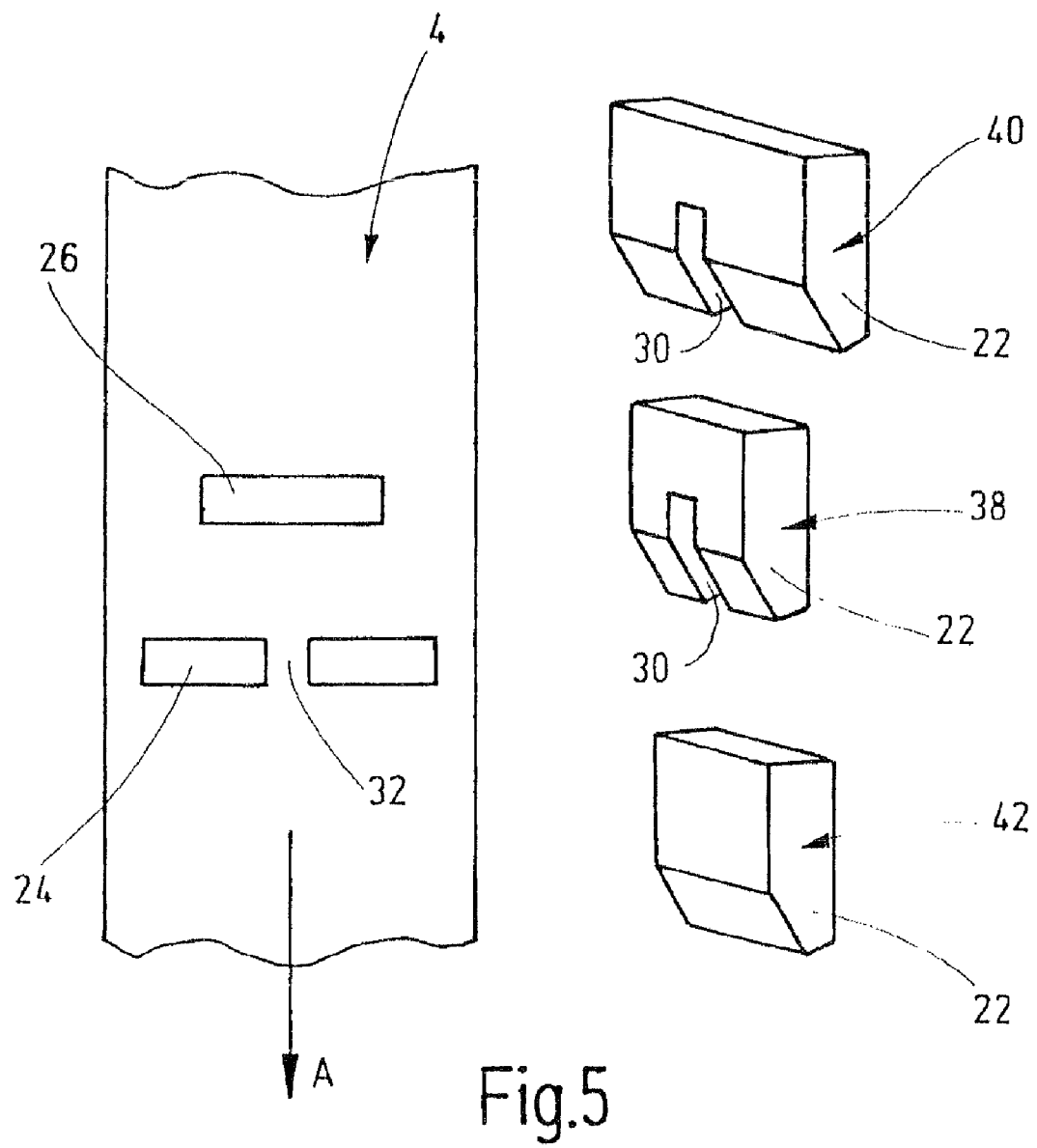
FIG. 5: a simplified top view of a similar battery pack in conjunction with three locking bars, shown in perspective, of different electrical devices.

In a distinction from the battery pack 4 described earlier above, the two grooves 24 and 26 of the battery pack 4 shown in a top view in FIG. 5 additionally have a different length transversely to the direction of motion of the battery pack, and the rear groove 26 is shorter than the front groove 24 that is interrupted by the rib 32. As a result, it is attained that the locking mechanism 12 of an electrical device, for the sake of double locking, enters into engagement with both grooves 24 and 26, if, as is the case for the center locking bar 38 in FIG. 5, the front face end 22 of the locking bar 38 is somewhat narrower than the groove 26 and has a slot 30, diametrically opposite the rib 32 of the groove 24, for receiving the rib 32. Conversely, if the front face end 22 is wider than the groove 26 and has a slot 28 diametrically opposite the rib 30 of the groove 24, as in the case of the upper locking bar 40 in FIG. 5, the locking bar enters into engagement only with the front groove 24, while only if its front face end 22 is somewhat narrower than the groove 26 but is not provided with a slot 28, as in the case of the lower locking bar 42 in FIG. 5, does it enter into engagement with the rear groove 26. In both of these last two cases, upon engagement of the locking bar 40 or 42, not only the mechanical locking but also the electrical contact between the batteries of the battery pack 4 and the current circuit of the consumer of the electrical device are established.

It will be understood that each of the elements described above, or two or more together, may also find a useful application in other types of constructions differing from the types described above.

While the invention has been illustrated and described as embodied in a device for locking electrical devices, in particular power tools, with battery packs for power supply, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A battery pack for locking with a power tool with at least one movable locking bar, said battery pack comprising at least a front recess and a rear recess located after the front recess in a direction of a relative motion between the battery pack and the power tool, wherein said recesses are configured as differently shaped detent grooves that are offset transversely to the direction of the relative motion, and wherein upon locking, the at least one movable locking bar engages successively the front recess and then the rear recess.

2. A battery pack as defined in claim 1, wherein said recesses are of different dimensions.

3. A battery pack as defined in claim 1, wherein a protrusion is protruding into one of said recesses.

4. A battery pack as defined in claim 3, wherein said protrusion is a rib in said recess.

5. A battery pack as defined in claim 4, wherein said protrusion in said recess permits an engagement of the locking bar with a cutout that receives said protrusion and prevents an engagement of a locking bar without such a cutout.

6. A power tool for locking with a battery pack with at least one movable locking bar, said power tool comprising at least a front recess and a rear recess located after the front recess in a direction of a relative motion between the battery pack and the power tool, wherein said recesses are configured as differently shaped detent grooves that are offset transversely to the direction of the relative motion, and wherein upon locking, the at least one movable locking bar engages successively the front recess and then the rear recess.

7. The power tool as defined in claim 6, wherein said recesses are of different dimensions.

8. The power tool as defined in claim 6, wherein a protrusion is protruding into one of said recesses.

9. The power tool as defined in claim 8, wherein said protrusion is a rib in said recess.

10. The power tool as defined in claim 9, wherein said protrusion in said recess permits an engagement of the locking bar with a cutout that receives said protrusion and prevents an engagement of the locking bar without such a cutout.

* * * * *